United States Patent [19]

Anderton

[11] Patent Number: 4,842,362
[45] Date of Patent: Jun. 27, 1989

[54] HOUSING FOR A FIBER OPTIC SPLICE

[75] Inventor: John J. Anderton, Oil City, Pa.

[73] Assignee: GTE Products Corporation, Stamford, Conn.

[21] Appl. No.: 691,739

[22] Filed: Jan. 16, 1985

Related U.S. Application Data

[63] Continuation of Ser. No. 418,339, Sep. 14, 1982, abandoned.

[51] Int. Cl.$^4$ ............................. G02B 6/36; G02B 7/26
[52] U.S. Cl. ................................ 350/96.20; 350/96.21
[58] Field of Search ........................... 350/96.20, 96.21

[56] References Cited

U.S. PATENT DOCUMENTS 4,084,882  4/1978  Hogan et al. .................... 350/96.20
4,353,619  10/1982  Parr ................................ 350/95.21

Primary Examiner—William L. Sikes
Assistant Examiner—Robert E. Wise
Attorney, Agent, or Firm—William H. McNeill; John O. Odozynski

[57] ABSTRACT

A housing for a fiber optic splice, in particular, for a splice of the glass tubular type, includes mating top and bottom sections. The bottom section is characterized by two sets of four chamfered teeth positioned at either end and along the sides of a primary portion. A trough is formed in the primary portion so as to accommodate the contours of the particular splice to be encountered. The top section includes a center portion with walls extending upwards from both sides. Elevated members extend upward from the surface at each end of the center portion so as to provide, in concert with the chamfered teeth of the bottom section, an aperture through which a glass fiber may be inserted. Tapered tabs in the walls of the top section lock into longitudinal cavities cut out of the bottom section so as to maintain a relatively fixed relationship between the two sections.

11 Claims, 2 Drawing Sheets

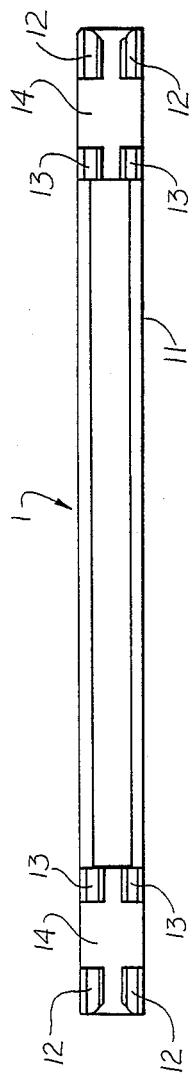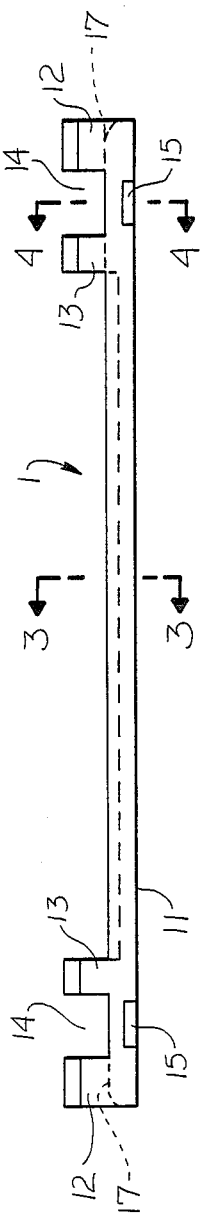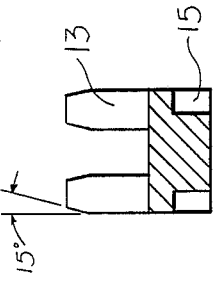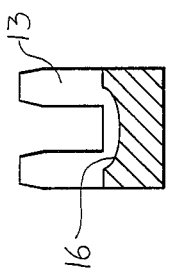

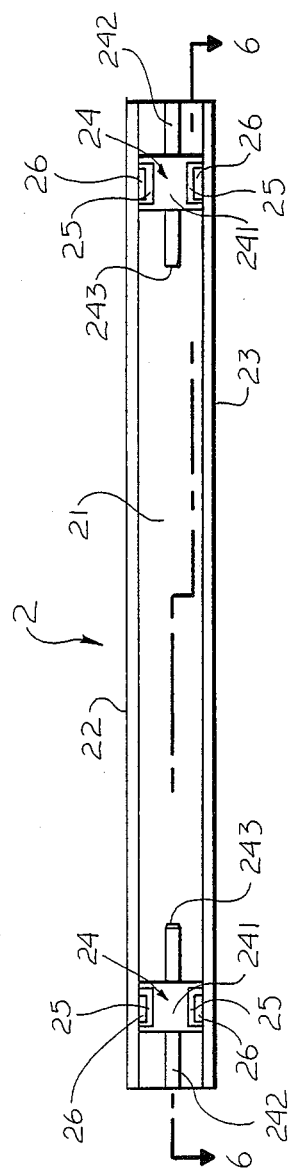
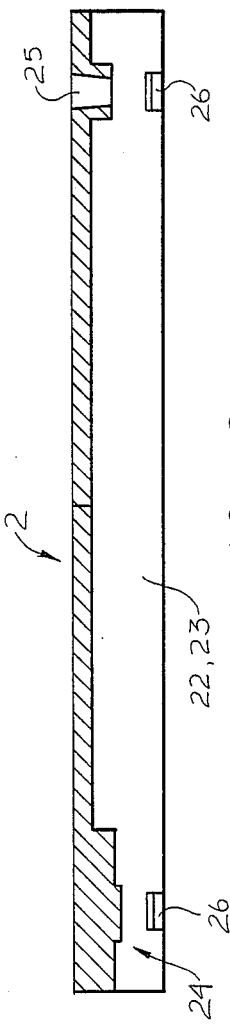
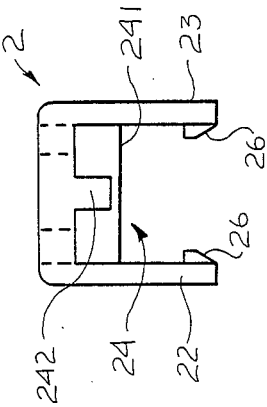
FIG. 5
FIG. 6
FIG. 7

HOUSING FOR A FIBER OPTIC SPLICE

TECHNICAL FIELD

This invention relates to connecting apparatus for optical fibers and more particularly to a housing for enclosing the ends of two optical fibers subsequent alignment and connection via a fiber optic splice.

BACKGROUND OF THE INVENTION

There are many advantages to transmitting light energy via optical fiber wave guides and the use thereof is diverse. Single or multiple fiber wave guides may be used simply for transmitting light to a remote location. Complex communication systems may transmit multiple specific optical signals. These devices often require the coupling of fibers in end-to-end relationship. The coupling is a source of light loss with axial misalignment representing a particularly serious problem. Other factors causing signal loss are angular misalignment of fibers, longitudinal separation of fiber ends and reflection or refraction at the fiber ends.

When placing optical fibers in end-to-end relationship to minimize light loss, it is desirable to have a rugged splice that can be simply and reliably used in field installations. The junctioned fibers should be protected from environmental factors and be securely held in place.

The following patents relate to various fiber optic connectors: U.S. Pat. No. 3,922,064 to Clark et al, U.S. Pat. No. 3,990,779 to McCartney, U.S. Pat. No. 4,050,783 to Tardy, U.S. Pat. No. 4,050,781 to Beauhaire, U.S. Pat. No. 4,097,129 to Wellington et al, and U.S. Pat. No. 4,146,299 to Wellington et al.

In addition, once two or more optical fibers have been successfully joined by virtue of an appropriate splice, it remains necessary to enclose the splice in a suitable housing in order to, inter alia, provide the splice with a degree of protection from the surrounding environment. To that end, U.S. patent application Ser. No. 396,522, by the same inventor as this application, filed July 8, 1982, and now abandoned, discloses a housing that is suitable for the enclosure of a splice such as disclosed in U.S. Pat. No. 4,257,674 to Griffin et al.

The subject invention represents what is at present deemed to be a paradigmatic configuration for enclosing a fiber optic splice of the loose-buffered, glass tubular type.

DISCLOSURE OF THE INVENTION

The above and other objects, advantages and capabilities are achieved in one aspect of the subject invention by a housing for a fiber optic splice, said housing including top and bottom sections. The bottom section is characterized by two sets of teeth positioned at opposite ends and along the sides of a substantially rectangular primary portion. Two pairs of longitudinal cavities positioned near the opposite ends of the bottom section cut out of the bottom surface of the primary portion. A trough is cut out of the primary portion so as to accommodate the contours of a particular fiber optic splice to be encountered.

The top section of the housing includes a center portion with walls extending upward from both sides of the center portion. Elevated members, integral to and positioned at the ends of the center portion protrude from the surface of the center portion, thereby providing, in concert with the teeth of the bottom section, an aperture through which a glass fiber may be inserted into a fiber optic splice. Tapered tabs extending outwardly from the inner surfaces of the walls lock into longitudinal cavities cut out of the bottom section so as to maintain a relatively secure relationship between two sections.

BRIEF DESCRIPTION OF THE DRAWINGS

FIG. 1 is a plan view of the bottom portion of the housing;

FIG. 2 is a side elevational view of the bottom portion of the housing;

FIG. 3 is a sectional view, on an enlarged scale, taken along the line 3—3 of FIG. 2;

FIG. 4 is a sectional view, on an enlarged scale, taken along the line 4—4 of FIG. 2;

FIG. 5 is a plan view of the top portion of the housing;

FIG. 6 is an elevational, sectional view taken along the line 6—6 of FIG. 5; and FIG. 7 is an end view, on an enlarged view of the top housing.

DESCRIPTION OF A PREFERRED EMBODIMENT

As illustrated in FIGS. 1 and 5, the subject splice housing comprises respective mating bottom and top sections 1 and 2, each of a substantially elongated nature for accommodating and enclosing the ends of an optical fiber and fiber optic splice used for joining those ends.

Referring now to FIGS. 1 through 4, the bottom section 1 of this housing is characterized by an elongated, substantially rectangular primary portion 11 which may have a total length, width and thickness of 3,00, 0.180 and 0.087 inches (75 mm, 4.5 mm, and 2.175 mm) respectively (It should be noted that the dimensions stated above and hereinafter are provided solely to facilitate a more concrete perception of a specific splice housing and in no way delimits the scope of this invention.). Extending upward approximately 0.238 inch (5.95 mm) from and located along the sides and at the ends of primary portion 11 of the bottom section 1 are two sets of four teeth members. Four of the teeth, designated as elements 12, are positioned substantially at the respective longitudinal extremities of the bottom section 1 while the remaining four, designated as elements 13, are positioned somewhat inwardly from the extremities. Although the teeth have an approximately identical thickness, 0.058 inch (1.45 mm), teeth 12 may be measurably longer than teeth 13; respective lengths of 0.150 and 0.100 inch (3.75 mm and 2.5 mm) are deemed typical. As shown in FIGS. 3 and 4, the teeth have a chamfer of approximately 0.010 inch (0.25 mm) at an angle of 15 degrees from the sides of the teeth. As can be most readily seen from the top and side views, FIGS. 1 and 2, the four pairs of the teeth are positioned so as to form spaced portions 14 having a length of approximately 0.200 inch (5 mm). The bottom section 1 of the splice housing also includes four substantially rectangular grooves 15 located beneath the spaced portions. The grooves are typically characterized by a length, width and height of approximately 0.150, 0.040, and 0.055 inch (3.75 mm, 1 mm, and 1.375 mm), respectively. The function of the grooves will be made clear later in the disclosure. Also, as can be most clearly seen in FIG. 3, a larger part of the primary portion 11 of the bottom section 1 of the housing, that is, the part bounded by the more inwardly positioned, teeth 13, has been provided with a cutout segment, or trough 16, characterized by a more or less arcuately shaped profile. The profile of the cutout segment 16, in a specific embodiment, subtends an arc of a circle having a radius of 0.085 inch (2.125 mm). In that embodiment the cutout profile is designed to accommodate a particular tubularly configured splice of a corresponding radius. Accordingly, the cutout profile admits of modification, without departure from the subject invention, necessary to accommodate variously configured fiber optic splices. Finally, both the ends of teeth 12, as seen in FIG. 1, and the ends 17 of the primary portion 11 of the bottom section 1 as seen in FIG. 2, may be slightly rounded so as to facilitate the insertion of optical fibers thereinto.

Attention is now drawn to the top section 2 of the housing as illustrated in FIGS. 5-7. As shown therein, the top section 2 comprises a substantially rectangular portion 21 having a length of approximately 3.00 inches (75 mm) and a width of approximately 0.275 inches (6.875 mm). Extending upwards from the sides of the center portion are two wall portions 22 and 23, each having a height of approximately 0.275 inches (6.875 mm) so that a side view of the top section assumes a generally U-shaped form characterized by three equivalent sides. Integral to the center portion of the top section are two elevated members 24 positioned at each end of the center portion. The elevated members each comprise a middle segment 241 and a pair of arm segments, 242 and 243, extending longitudinally from opposite sides of the middle segment along a central axis of the center portion. The total length of each of the elevated members is 0.450 inch (11.25 mm), 0.150 inch (3.75 mm) allotted to each arm and 0.150 inch (3.75 mm) the middle section. The arm segments are elevated a total of approximately 0.060 inch (1.5 mm) from the surface of the center portion and the middle segments are elevated somewhat beyond the arm segments. A pair of slots 25, a total of four, are cut in each of the middle segments of the elevated members, one adjacent each of the walls of the top section. The length of the slots is slightly shorter than the length of the middle segments and their width is approximately 0.040 inch (1 mm). The elevated members 24 are designed so that, with the top section 2 placed over the bottom section 1 of the housing, the teeth members 12 and 13 of the bottom segment will be aligned on opposite sides, that is, two on each of the opposite sides of each arm segment. In addition, the middle segment 241 of each elevated member 24 will align with the spaced portions 14 formed by each of the two sets of four teeth in the bottom section. In addition, each of the wall portions of the top section includes a pair of tapered flange members 26, or tabs, extending a total of approximately 0.150 inch (3.75 mm) from the sides of the wall portions. The four flange members 26 are designed to align with the four slots 15 in the bottom section 1 so that, subsequently, in a press fit of the top section 2 over the bottom 1, a locked condition is maintained between the top and bottom sections of the housing. A substantially fixed relationship is thereby maintained, via the interaction of the elevated members 24 and spaced portions 14, as well as the locked tabs 26 and slots 15, so as to provide proper enclosure of a fiber optic splice within the housing.

Accordingly, while there has been disclosed and described what at present is believed to be a preferred embodiment of a housing for a fiber optic splice, it will be obvious to those skilled in the art, that various changes and modifications may be made therein without departing from the scope of the invention as defined by the appended claims.

INDUSTRIAL APPLICABILITY

The invention is useful in the implementation of fiber optic communication and information delivery systems.

What is claimed is:

1. A housing for a fiber optic splice, the housing including:
   a bottom section comprising:
   (a) a substantially rectangular, longitudinally extending primary portion,
   (b) a first set of teeth positioned at one end of the primary portion,
   (c) a second set of teeth positioned at the other end of the primary portion,
   (d) a first pair of cavities, cut out of the bottom surface of the primary portion and positioned on opposite sides and at one end of the primary portion, and
   (e) a second pair of cavities cut out of the bottom surface of the primary portion and positioned on opposite sides and at the other end of the primary portion, said housing further including:
   a top section comprising:
   (a) a substantially rectangular, longitudinally extending center portion,
   (b) a pair of wall members extending downwardly along the sides of the center portion,
   (c) a pair of elevated members integral to and protruding downwardly from a surface of the center portion, said elevated members positioned at opposite ends of the center portion, and
   (d) tapered tabs extending inwardly from the inner surfaces of the wall members, whereby the top section may be positioned over the bottom section so that the elevated members of the top section align with the teeth of the bottom section thereby providing an aperture into which a glass fiber may be inserted and whereby the tapered tabs of the top section may be pressed flat so as to lock into the cavities of the lower section so as to maintain a relatively secure relationship between the two sections.

2. A housing as defined in claim 1 wherein the primary portion of the bottom section comprises a trough for accommodating a fiber optic splice.

3. A housing as defined in claim 2 wherein the trough is characterized by an arcuately shaped profile so as to accommodate a tubular splice.

4. A housing as defined in claim 1 or claim 2 wherein the teeth comprised by the bottom section are chamfered.

5. A housing as defined in claim 4 wherein the first set of teeth and the second set of teeth each consist of four teeth, a first pair positioned on one side of the primary portion and a second pair positioned on the other side of the primary portion.

6. A housing as defined in claim 5 wherein the pairs of teeth are characterized by teeth of measurably unequal length.

7. A housing as defined in claim 1 wherein said first and second pairs of cavities are characterized by substantially rectangular profile.

8. A housing as defined in claim 1 wherein the elevated members comprise a middle segment and a pair of arm segments extending outwardly from opposite sides of the middle segment along a longitudinal axis of the center portion.

9. A housing as defined in claim 8 wherein the center portion of the top section comprises two pairs of slots cut out of and positioned at opposite ends of the center portion.

10. A housing as defined in claim 9 wherein at least some of the teeth of the bottom section are rounded.

11. A housing as defined in claim 1 wherein said elevated member have middle segments which protrude somewhat further than the arm segments from the surface of the center portion.

* * * * *